(12) United States Patent
Raniere

(10) Patent No.: US 9,243,950 B2
(45) Date of Patent: Jan. 26, 2016

(54) METHOD AND DEVICE FOR ANALYZING RESONANCE

(71) Applicant: FIRST PRINCIPLES, INC., Albany, NY (US)

(72) Inventor: Keith A. Raniere, Clifton Park, NY (US)

(73) Assignee: FIRST PRINCIPLES, INC., Albany, NY (US)

( * ) Notice: Subject to any disclaimer, the term of this patent is extended or adjusted under 35 U.S.C. 154(b) by 313 days.

(21) Appl. No.: 13/838,747

(22) Filed: Mar. 15, 2013

(65) Prior Publication Data

US 2014/0260620 A1    Sep. 18, 2014

(51) Int. Cl.
*G01H 13/00*    (2006.01)
*F16F 15/00*    (2006.01)
*G10D 1/02*    (2006.01)

(52) U.S. Cl.
CPC .............. *G01H 13/00* (2013.01); *F16F 15/00* (2013.01); *G10D 1/02* (2013.01)

(58) Field of Classification Search
CPC ............ G01H 13/00; F16F 15/00; G10D 1/02
USPC .......................................................... 73/579
See application file for complete search history.

(56) References Cited

U.S. PATENT DOCUMENTS

| | | | |
|---|---|---|---|
| 4,909,126 A | 3/1990 | Skinn et al. | |
| 5,009,142 A | 4/1991 | Kurtz | |
| 5,095,797 A | 3/1992 | Zacaroli | |
| 5,665,941 A | 9/1997 | Wehhofer et al. | |
| 5,717,155 A | 2/1998 | Szalay | |
| 5,767,429 A | 6/1998 | Milano et al. | |
| 5,877,447 A | 3/1999 | Vice | |
| 5,886,270 A | 3/1999 | Wynn | |
| 5,977,467 A | 11/1999 | Freeland et al. | |
| 6,184,452 B1* | 2/2001 | Long et al. | 84/457 |
| 6,278,047 B1 | 8/2001 | Cumberland | |
| 6,697,682 B2 | 2/2004 | Dozono et al. | |
| 7,376,236 B1* | 5/2008 | Norris et al. | 381/111 |
| 7,659,467 B2* | 2/2010 | Adams | 84/306 |
| 7,786,373 B2* | 8/2010 | Adams | 84/728 |
| 7,858,865 B2* | 12/2010 | D'Arco | 84/454 |
| 8,450,593 B2* | 5/2013 | Ierymenko et al. | 84/723 |
| 8,872,010 B2* | 10/2014 | Villaran-Valdivia | 84/455 |
| 8,927,838 B2* | 1/2015 | Jalgha | 84/304 |
| 2004/0056779 A1 | 3/2004 | Rast | |
| 2004/0134334 A1 | 7/2004 | Baggs | |

* cited by examiner

*Primary Examiner* — J M Saint Surin
(74) *Attorney, Agent, or Firm* — Schmeiser, Olsen & Watts, LLP

(57) ABSTRACT

The invention is directed toward detection, analyzation and correction of unwanted frequencies. The elimination of the wolf tone may be done through either correction of surface instability or dynamic frequency correction by a signal generator.

7 Claims, 8 Drawing Sheets

METHOD AND DEVICE FOR ANALYZING RESONANCE

FIELD OF THE TECHNOLOGY

The present invention relates to a method and device for analyzing resonance in musical instruments, automotive vehicles, or other structures.

BACKGROUND

In physics, resonance is the tendency of a system to oscillate with high amplitude when excited by energy at a certain frequency. This frequency is known as the system's natural frequency of vibration or resonant frequency. A resonant object, whether mechanical, acoustic, or electrical, will probably have more than one resonant frequency (especially harmonics of the strongest resonance). It will be easy to vibrate at those frequencies, and more difficult to vibrate at other frequencies. The resonant object will "pick out" its resonant frequency from a complex excitation, such as an impulse or a wideband noise excitation. In effect, it is filtering out all frequencies other than its resonance. Mechanical resonance is the tendency of a mechanical system to absorb more energy when the frequency of its oscillations matches the system's natural frequency of vibration (its resonant frequency) than it does at other frequencies.

When playing a musical instrument, such as a violoncello (commonly referred to as the cello), the cellist will choose which string or strings to play by depressing the string or strings on a fingerboard while bowing in techniques such as standard bowing, double stops, col legno, spiccato or staccato or by plucking using pizzicato. A difficulty that arises when performing using these various playing techniques on the cello is that during play, mechanical resonance may occur in strings and/or the body of the instrument. Such mechanical resonance causes undesired sound waves hereinafter referred to as wolf tone which may be detrimental to the sound during the performance of the cellist.

In addition, resonance may be detrimental in other acoustic, mechanical or electrical devices.

SUMMARY

A first general aspect of the invention provides a device for analyzing and compensating for instability and surface tension due to resonance of vibrations of a material, said device comprising: a microprocessor; a sensor, to measure vibrations due to resonance of a surface of said material at a frequency, said sensor having an output in electrical communication with the microprocessor when vibrations are present at the measured frequency; a tensioner for adjusting surface tension of the measured surface to reduce resonance, wherein said tensioner adjusts tension when said microprocessor determines resonance as sensed by said sensor.

A second general aspect of the invention provides a device for analyzing and correcting undesired resonance comprising: a power source; a microprocessor electrically connected to the power source; a sensor having an output, wherein the sensor is electrically connected to the microprocessor, which receives the output from the sensor, wherein the microprocessor generates a result; and a frequency generator, wherein the generator is determined by the microprocessor and compensates for the unwanted resonance.

A third general aspect of the invention provides a method for analyzing and correcting vibrations comprising: providing a sensor for detecting vibrations; providing a feedback loop for gathering sensed vibrations; providing a signal generator to augment the vibration; sampling the augmented vibration with the sensor; and analyzing the augmented vibration detected by the sensor with a microprocessor to determine deviance from an ideal vibration.

DETAILED DESCRIPTION

Figure 1:
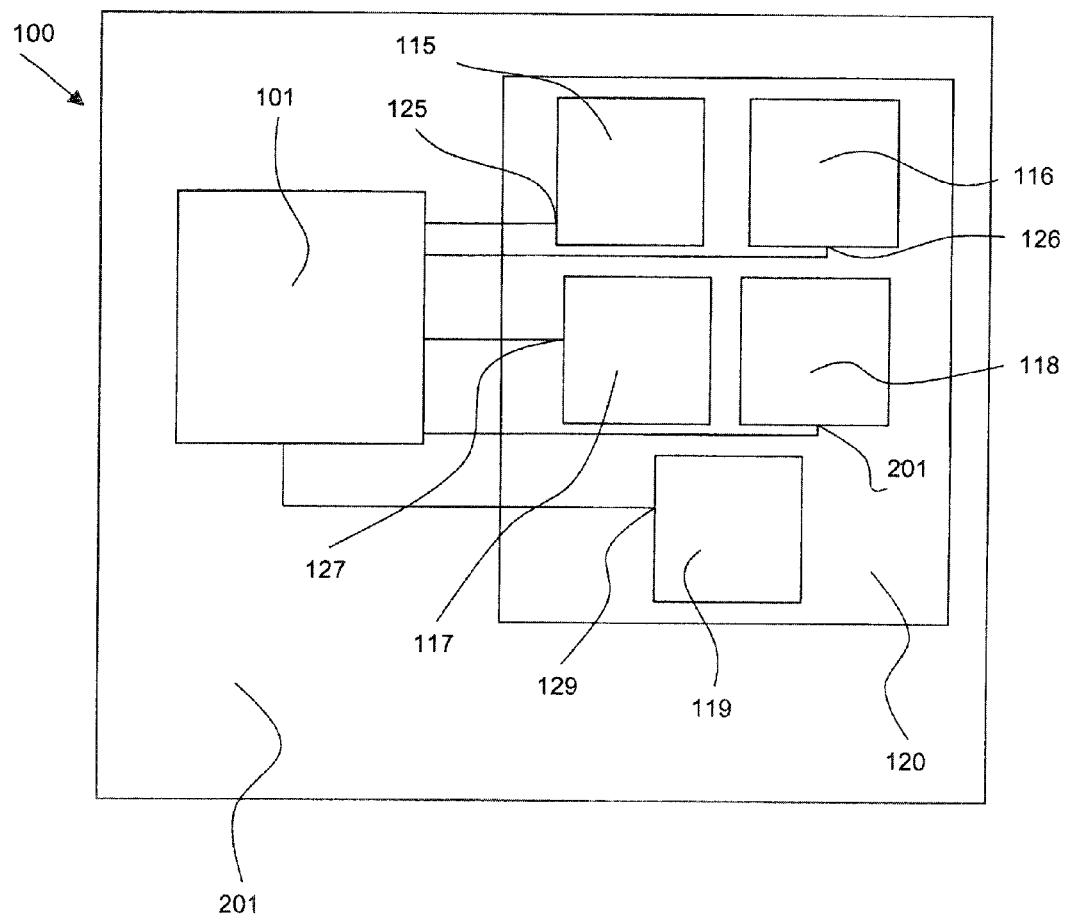
FIG. 1 shows the components of a device for sensing and analyzing both environmental factors and vibrations in accordance with the present invention.

The invention diagnoses and addresses problems associated with resonance in acoustic, mechanical or electrical devices and may address deficiencies in their underlying structures. Vibrations, such as sound, travel in waves and have a certain frequency. The normal unit that a frequency is measured in is hertz, which is one cycle per second. Musical frequencies are between 20 and 20,000 hertz, which coincides with what is considered the normal range of human hearing. Waves also have intensity or level called amplitude, which is a measure of the strength of the wave. The problems with unwanted vibrations and harmonics in all objects are important, but these problems are especially important in the field of acoustics.

There exists in the field of acoustics, specifically in the field of stringed instruments, a specific phenomenon known as the wolf tone that can not be corrected by mere "tuning" in the conventional sense on a string instrument. A wolf tone is defined as a type of destructive chord with a wildly fluctuating and uncontrollable tone that deviates in desired frequency or loudness from a given note on a major scale.

The invention comprises a device 100 that is useful for both analyzing and compensating for instability and surface tension in all objects, including examples of either the class of instruments that may be plagued by the wolf tone or certain automobiles that may require automotive NVH screening.

The device 100 may be used, for example, on an instrument in the class of those instruments that may be plagued by the wolf tone, including but not limited to the: violin, guitar, cello, base, banjo, harp, harpsichord, piano, viola, mandolin and ukulele. The device 100 examines the resonance of vibrations of a material and, if required, addresses the vibrations with several different methods by adjusting either the surface tension or other another unsatisfactory condition. The problem with a wolf tone is that in some circumstances and conditions it is present, and in other conditions it is absent. The wolf tone generally occurs, for example, on the violin between the E and F pitch. The wolf tone may not occur with what seems like regularity because it may be affected by environmental factors such as temperature or humidity, as well as structural deficiencies of the body of the instrument.

When a string on an instrument is plucked or bowed, waves travel back and forth through the medium being reflected at each fixed end. Waves of certain magnitudes can survive on the medium and all others are canceled out through either dampening or interaction with other waves. These waves are called the harmonics of the vibration and will not cancel each other out as they reflect back upon themselves. The harmonics are considered standing waves because they produce patterns which do not move. On a medium such as a violin string, several harmonically related standing wave patterns are possible. It is important to understand that for any one given medium fixed at each end only certain sized waves can stand.

When examining the acoustic waves of a stringed instrument, the first pattern has the longest wavelength and is called the first harmonic or the fundamental. The second harmonic has half the wavelength and twice the frequency of the first harmonic and is called the first overtone. The third harmonic has one third the wavelength and three times the frequency when compared to the first harmonic and is called the second overtone. The instrument having a structural instability that causes the interaction of these harmonics in various unexpected and undesirable resonance combinations is also referred to as the wolf tone. The device 100 can identify and isolate the structural elements that are causing the unexpected and undesirable resonance combinations, i.e. causing a wolf tone.

The higher harmonics almost always have maximum amplitudes much less than the fundamental, or first, harmonic. It is the fundamental frequency that determines the note that humans hear and, therefore, it should be considered the most important harmonic to observe first in determining the existence of destructive chords in an instrument. It is the upper harmonic structure that determines the timber of the instrument that is analyzed by the invention. However, the timber of the instrument may be deficient in some manner and cause a distortion in the fundamental frequency.

Referring to FIG. 1, the components of a device 100 for sensing and analyzing both environmental factors and vibrations are shown in accordance with the present invention. The device 100 measures the conditions that are present during unwanted harmonics. The device 100 may create a feedback loop to constantly monitor the conditions present over a period of sampled time when an unwanted harmonic is present. The device 100 may comprise a microprocessor 101 connected to sensors 120 that monitor any direct correlation of an environmental condition to a harmonic or resonation problem. Microprocessor 101 may be a microprocessor that is available commercially in many different forms. One such example is a simple microprocessor, such as an 8 bit circuit. Another such example includes more advanced based circuits, like those commonly associated with a desktop computer.

The initial testing may measure with a plurality of sensors 120 many parameters such as wave frequency sensor 115, wave amplitude sensor 116, temperature sensor 117, moisture sensor 118, surface tension sensor 119 or additional other desired parameters to help pinpoint the conditions at which the unwanted harmonic is caused in a particular instrument or structure. The sensors 120 may monitor and pinpoint a correlation to the unwanted harmonic divergence from the ideal tone to one or more monitorable conditions over a period of time.

The surface tension of the body of an instrument may be measured simply by pointing the surface tension sensor 119 of the device 100 at the body of an instrument 201, emitting a frequency wave and analyzing the feedback signal. This works on the principle that when a tensioned member anchored at two points is struck, it will vibrate at a frequency related to its tensile stress. The tensile stress of the material of the body of an instrument is a commonly known phenomenon. The reflected wave could also be compared to a reflected wave of a similar type and make of instrument not known to be effected by a wolf tone. For example, during the testing for the wolf tone, the test may indicate that the wolf tone is created by either too great or too little humidity. Accordingly, the solution would be to store the resonating object under certain conditions of humidity. Further, the moisture sensor 118 may have an alarm triggered when the acceptable conditions, either high or low, are exceeded. Moisture sensor 118 may be comprised of various different sensors to allow it to measure moisture levels such as a sensor that measures the change in conductance or resistance of a material by using infrared light or a laser.

Regardless of which sensor 115, 116, 117, 118 or 119 is selected to measure an unwanted harmonic, each sensor may be comprised of various individual sensors, and may be calibrated in relation to occurrence of the particular unwanted harmonic under particular measurable environmental condition, such as moisture levels, and thereby the particular unwanted harmonic may be associated with the particular environmental condition. Additionally, sensors 120 may have outputs 125, 126, 127, 128, 129 that are in communication with microprocessor 101.

Wave frequency sensor 115 and wave amplitude sensor 116 may be used to measure directly the frequency and amplitude of the vibrations of a surface, or strings 202 of instrument 201. Further, sensors 115, 116 have outputs 125, 126 in electrical communication with the microprocessor 101 when vibrations are present.

For example, the frequency measured could be that of the ideal frequency of a certain component of a resonating object, where an unwanted harmonic had previously occurred in a spectrum broader than the limit of human hearing. Once the surface conditions are known, a specific and tailored fix for correction of an unwanted harmonic can be prepared for the resonating object.

For example, a wolf tone may be caused by the coupled oscillation of the string and body of a stringed instrument. The stringed instrument has two resonances; one resonance is from the string while the other is from the body of the instrument. For a coupled oscillation process to occur, the two resonances need to be very near equal in frequency, also known as a Helmholtz oscillation. There are two types of Helmholtz oscillations involved, one by bowing the instrument 201 and the other the ocarina or bottle effect of the main body of the instrument 201. A wolf tone may disrupt the normal bowing pattern of the instrument 201 and may excite the air resonance within, making the bridge 250 of the instrument 201 excessively yield. The yielding of the bridge 250 may prevent the strings 202 from properly resonating.

In other situations, the wave may oscillate forming a shifting of energy, which results in a warbling sound due to the beat frequency between the resonant frequencies of the body of the instrument 201 and the strings 202, respectively. In situations where the resonances are active, it may cause the production of a "growly" tone. If one of the resonances is inaudible, the instrument 201 can accumulate energy and then release it in one burst, like a sheep blat.

Wolf tones may be affected by changes in humidity, because sound travels faster in moist air which, in turn, causes the resonant frequencies of the air go up. The wood resonances may drop as the wood gets heavier and less stiff with changes in the humidity. A wolf tone can become more entrenched the more the instrument 201 is played. Additionally, a wolf tone may vanish if the instrument 201 is left to sit for long periods of time, unused. The concept behind instrument idleness allows the wood to stiffen back up again. Leaving an instrument 201 idle is largely undesirable, as during which time it is idle it cannot be played. Further, leaving an instrument 201 idle will not fix every problem. The device 100 addresses the problem without resorting to less effective and desirable alternative—lengthy periods of instrument 201 idleness.

Figure 2:
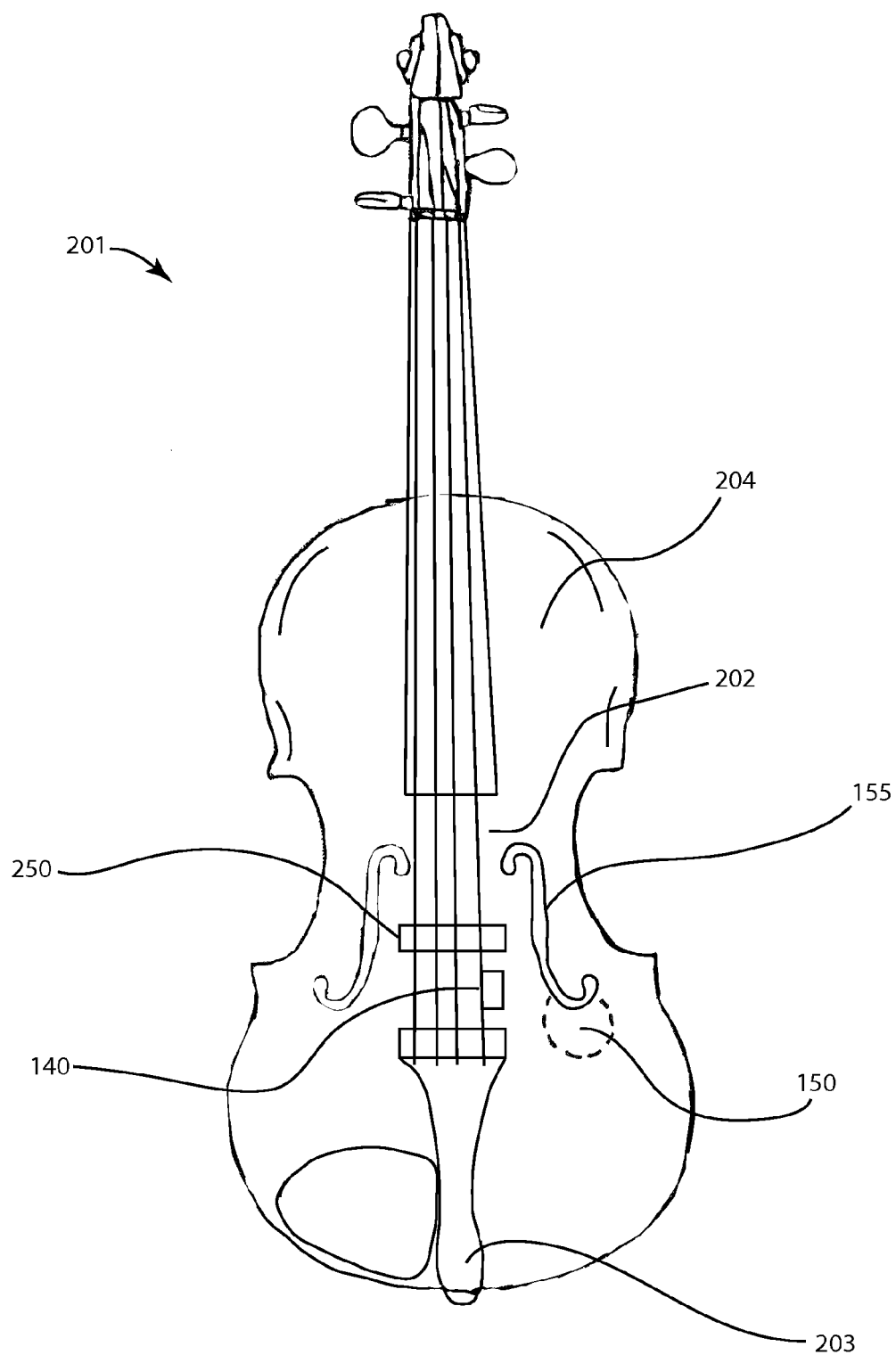
FIG. 2 shows the position where at least one substrate layer may be attached below the bass F-hole inside the instrument and also where a mute device may be attached to the short section of the strings in accordance with the present invention.

In certain instances, once the wolf tone is examined it may be prevented by mounting a mute element 140 on the short section of the strings 202 located below the bridge 250 of the instrument. As shown in FIG. 2, the mute element 140 may be attached to one or all of the strings 202. At this location, the mute element 140 may aid by damping the offending mode of resonance by forcing it to sound in that section of the string only. The mute element 140 may function by adding to the mass of the string anchor 203 in the vicinity of the offending strings 202. The mute element 140 has the effect of raising the impedance of the bridge 250 back to an acceptable level. The mute element 140, when attached to the instrument 201, may help to stiffen the sound board 204 so that it may not resonate as dramatically.

Figure 3:
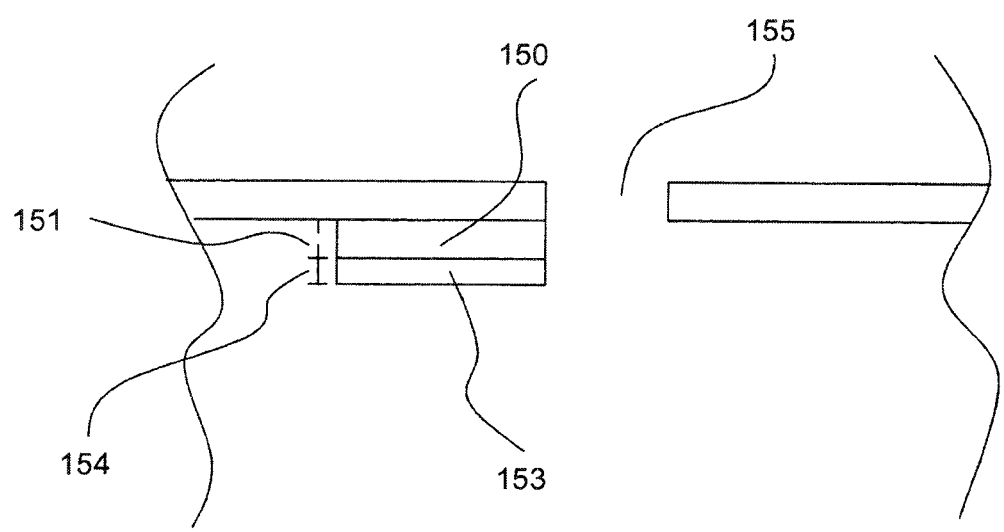
FIG. 3 shows a cross sectional view of two substrate layers attached on the inside of the instrument below the bass F-hole in accordance with the present invention.

Another embodiment of the invention may comprise the attachment of a substrate layer 150 to the inside of the top plate just below the bass F-hole 155, as shown in FIG. 2 and FIG. 3. The substrate layer 150 having a first thickness 151 and first stiffness can be removably affixed and then analyzed with the device 100. If the conditions for the wolf tone are still determined to be present after testing with the device 100, then a second substrate layer 153 having a second thickness 154 and a second stiffness may be substituted and retested, or additionally applied and retested.

Figure 4:
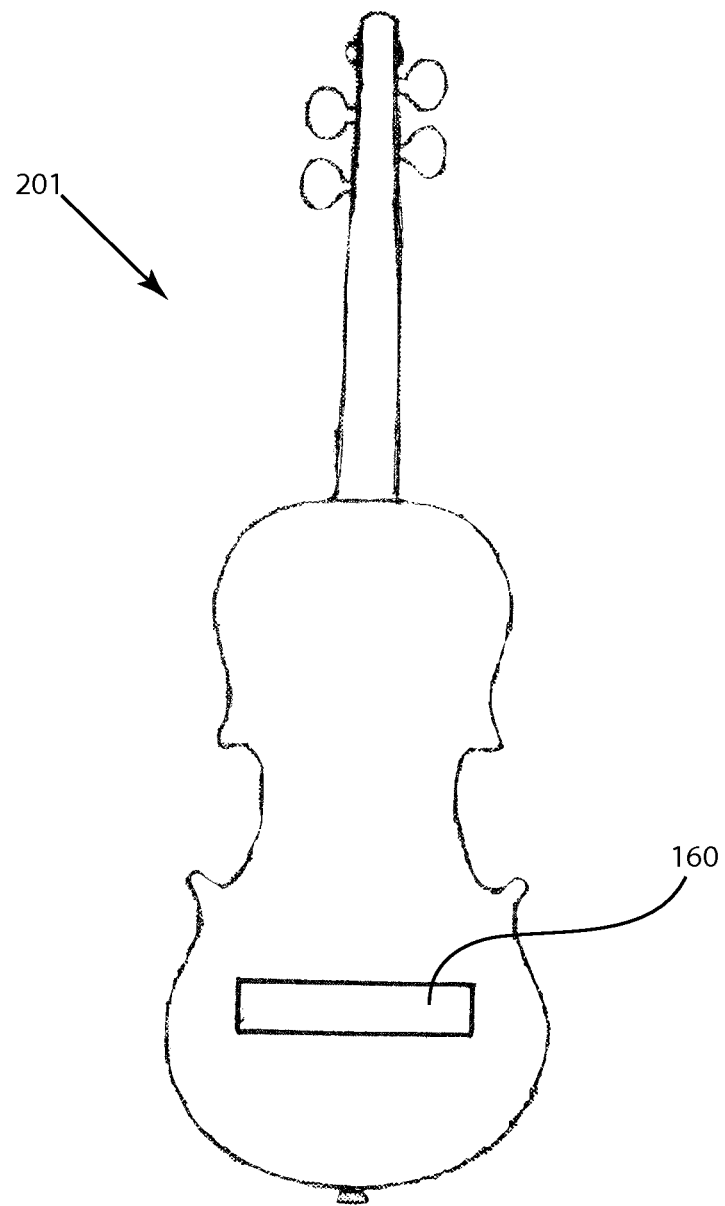
FIG. 4 shows a tensioner or compressive device attached to the back side of a stringed instrument in accordance with the present invention.

In another embodiment, a corrective response to a location where the instrument has been determined to have a wolf tone can be squeezed laterally by a compressive device 160, as shown in FIG. 4. Compressive device 160 may be placed on the bottom side of instrument 201. This compressive device 160 may act to dampen the vibration of the wood of the body by altering very slightly the shape and volume of the air cavity inside the body, thereby causing the alteration of the resonant frequencies.

Figure 5:
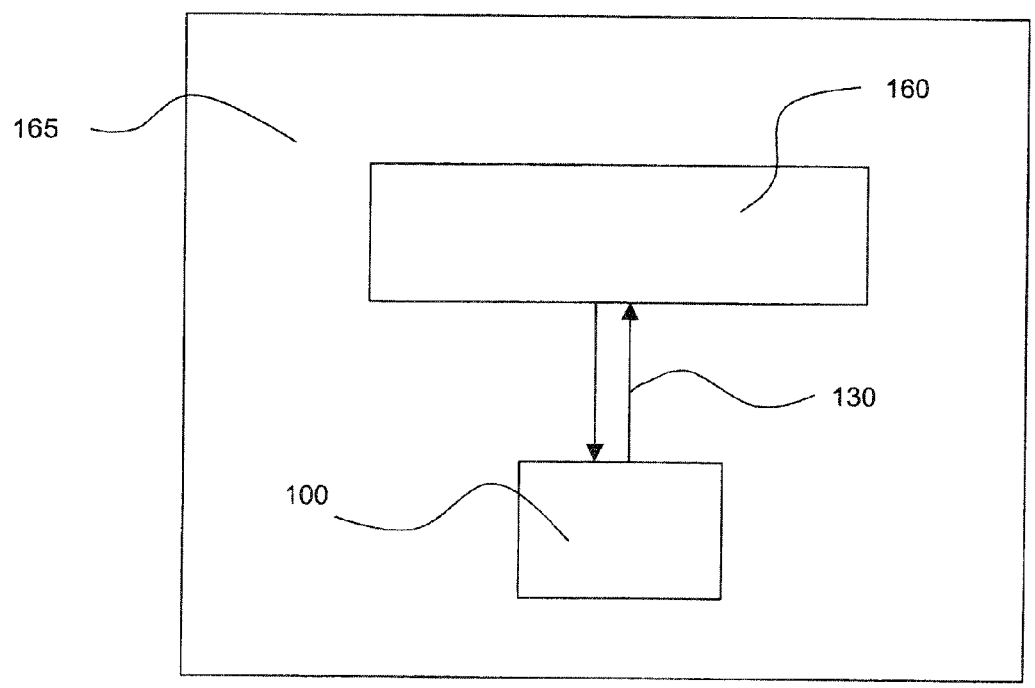
FIG. 5 shows a tensioner or compressive device in communication with a sensing and analyzing device, said tensioner device and said sensing device comprising one hybrid device in accordance with the present invention.

In one embodiment, the manner to address this deficiency in the timber of the instrument or measured surface may be by utilizing a tensioner 160 for adjusting surface tension of the measured surface. As discussed, the tension of a surface can be determined based on emitting a wave and comparing the emitted wave to the reflected wave, while basing the comparison on the known properties of the material. The tensioner 160 may be moved or adjusted to reduce undesirable vibrations on the measured surface. The device may then check for unwanted wolf tones in a feedback loop 130 so that tensioner 160 may properly adjust tension, as shown in FIG. 5. When the microprocessor 101 determines destructive waves or problematic chords as sensed by said sensors 120 are still present, then the tension may be further changed.

The tensioner 160 may be a length adjustable wire having at least two mounting points on the surface, wherein the tension of the wire controls the tension of the surface, thus changing the frequencies of the surface measured. For example, the surface could either be internal or external to the body of an instrument 201, or on the front or back face of an instrument 201. The length adjustable wire 160 could be mounted with an adhesive or screws. When operating with the surface of a guitar or cello, the surface tensioner 160 could be placed in the back exterior section of the instrument so as to not interfere with the reflected acoustics inside the body.

As shown in FIG. 5, the tensioner or compressive device 160 may be in communication with device 100 through a feedback loop 130. When sensors 120 of device 100 determine that there is a wolf tone, the microprocessor 101 of device 100 may communicate to cause compressive or tensioner device 160 to compress or create tension in instrument 201. In another embodiment, device 100 is included within compressive device 160 to comprise a single hybrid device 165. In this embodiment, a single device 165 may monitor and fix the wolf tone.

In another embodiment, the surface tension sensor 119 may also be a piezoelectric film having a plurality of layers, wherein the intensity of the electrical signal determines the tension of the surface in addition to the acoustic chord itself being measured. The method is based on the direct piezoelectric effect; vis. charge liberated following stress application. The compressive stresses imparted across the films top and bottom surfaces produce a charge to be liberated that is measured using charge amplifiers. The piezoelectric effect can also be used to create tension in a surface with a piezoelectric pusher for use as a tensioning member 160. When an electric charge is supplied to a piezoelectric pusher 160, it causes a change in length and thus tension in the surface of the instrument or object containing the piezoelectric pusher.

Once the tension of the surface is determined to be too low, which causes unwanted harmonics (confirmed by device 100), then the surface tension may be increased to compensate. In another embodiment, a tensioner 160 may be an additional surface layer having a greater rigidity that may be affixed to the original surface of the musical instrument in order to create a new surface tension. Application of this layer may cause an increase in surface tension sufficient to remove an unwanted wolf tone. One method may be chemically bonding a polymer surface layer to the surface material which is capable of migration into the weak pores of a substrate having insufficient rigidity. When the surface is coated with an epoxy, polyurethane, or cyanoacrylate, and allowed to fully cure, it causes increased surface tension. The layer may also be a section of wood or other material that is then either laminated or bonded with adhesives to the original surface. The adhesives may be permanent and cross-linked as discussed above or could be thermoplastic and bonded through heat or through chain-end migration into surface irregularities of the instrument.

Other examples are mechanical in nature, such as when surfaces are stretched, bonded, and then are returned to the original surface dimensions through molecular relaxation or internal forces. For example, a plastic can be mechanically stressed within its tensile limits when it is below its Tg and then upon heating, the plastic relaxes and attempts to return to its original dimensions. The plastics that are most effective may have high amounts of crystallinity, where the crystallinity in effect acts as internal coils that retract upon relaxation induced during heating.

In another embodiment, the tensioner 160 may comprise at least one force protruding implement configured to engage the surface of the material such that force applied at the fulcrum point tensions the surface. The force protruding element may be a rigid bar or some other implement that will multiply the force on a surface, creating tension when applied to the fulcrum point.

The wolf tone may be harmonic and, therefore, may be addressed dynamically with the introduction of a corrective wave. A wave usually does not reflect when it strikes other waves, but rather, it combines with other waves into one wave. In a constructive interference situation, the amplitudes of two waves have the same sign (both either positive or negative) and they will add together to form a wave with a larger amplitude. In a destructive interference situation, the two amplitudes have opposite signs and they will subtract to form a combined wave with lower amplitude. Constructive interference will make a sound louder while destructive interference will make a sound quieter.

Figure 6:
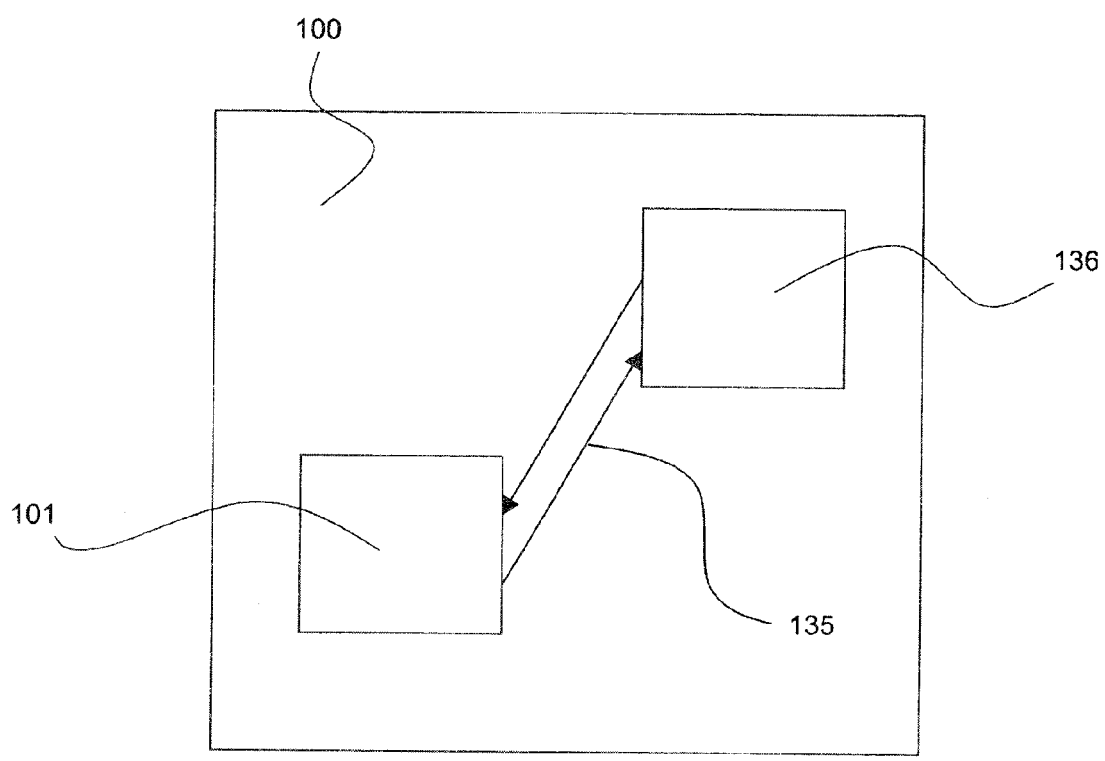
FIG. 6 shows a device for sensing and analyzing environmental factors and vibrations including a wave generating device that can communicate via a feedback loop with a microprocessor in accordance with the present invention.

In a further embodiment as shown in FIG. 6, the device 100 may further consist of a feedback loop 135 between a wave generating device 136 and microprocessor 101 that may provide a continuous monitoring and correction of a wolf tone by providing a frequency that will cancel out the unwanted secondary harmonics. Wave generating device 136 may add an additional wave comprising the proper shape and size (frequency and amplitude) to nullify the wolf tone's effect while still being present. When two waves are added together having different frequencies, the crests and troughs will not generally add up the same way with each new wave because one is moving faster than the other. Accordingly, wave generating device 136 may mimic and cancel out the wolf tone part of the waves by interfering destructively.

The material analyzed may be a string of a musical instrument, as previously discussed, or the material may also be surfaces of other structures, including, but not limited to: buildings, bridges, or even automobile members. All surfaces have an ideal tension to perform as required with the disclosed device. For example, the frame of a car can either be too soft or too stiff thus contributing too unwanted road noise.

That is, the device 100 may be utilized in analyzing and correcting unwanted vibrations of an automotive vehicle. Although certain vibrations in a vehicle are common during operation, certain vibrations may be indicative of, as referred to in the automotive industry, "automotive noise, vibration, and harshness" (hereinafter 'automotive NVH'). Automotive NVH is a symptomatic vibration that may be present in a various automotive systems, indicative of vehicle performance problems. As such, these respective vibrations comprise respective resonances, each of which may be analyzed in efforts to diagnose and correct automotive NVH.

The phenomenon of automotive NVH not only refers to cars, SUVs, vans, and trucks, but may also apply to motorcycles, four-wheelers, or even commercial trailer trucks. Automotive NVH may be related to various issues concerning the design, manufacture, material, or performance of vehicles. Additionally, automotive NVH may be a symptom of widely varying automotive issues, including, but not limited to such areas as: engine mounts, shock absorbers, brake systems, suspensions, tire noise, powertrain torsional systems, interior acoustics, body/frame mounting, door seals, induction and exhaust systems, belt vibration, transmission rattle, piston slap, or alternators.

Specifically herein, automotive NVH refers to interior acoustics, body/frame mounting, or even door seals. Issues with respect to interior acoustics, body/frame mounting, or door seals typically present ugly noise problems that detract from the quality of the vehicle, irritating the vehicle driver and passengers. Therefore, it is desirable to create a method and device for analyzing the resonance caused by the vibrations of the vehicle as it is affected by the impact of the wind, road, or other environmental surroundings during operation. Further, it is desirable to diagnose any atypical noises or sounds produced by the vehicle and correct any problems attributed to automotive NVH.

Many of the parts within the various systems of an automotive vehicle typically vibrate during operation, creating a resonance. However, automotive NVH is a symptomatic noise, rattle, vibration, squeak, or perceived harshness in operation that is distinctive from the ordinary and typical operational noises and vibrations. Therefore, the automotive NVH vibrations create resonances are independent from the traditional operating performance resonances which may be detected, measured, or analyzed.

Figure 7:
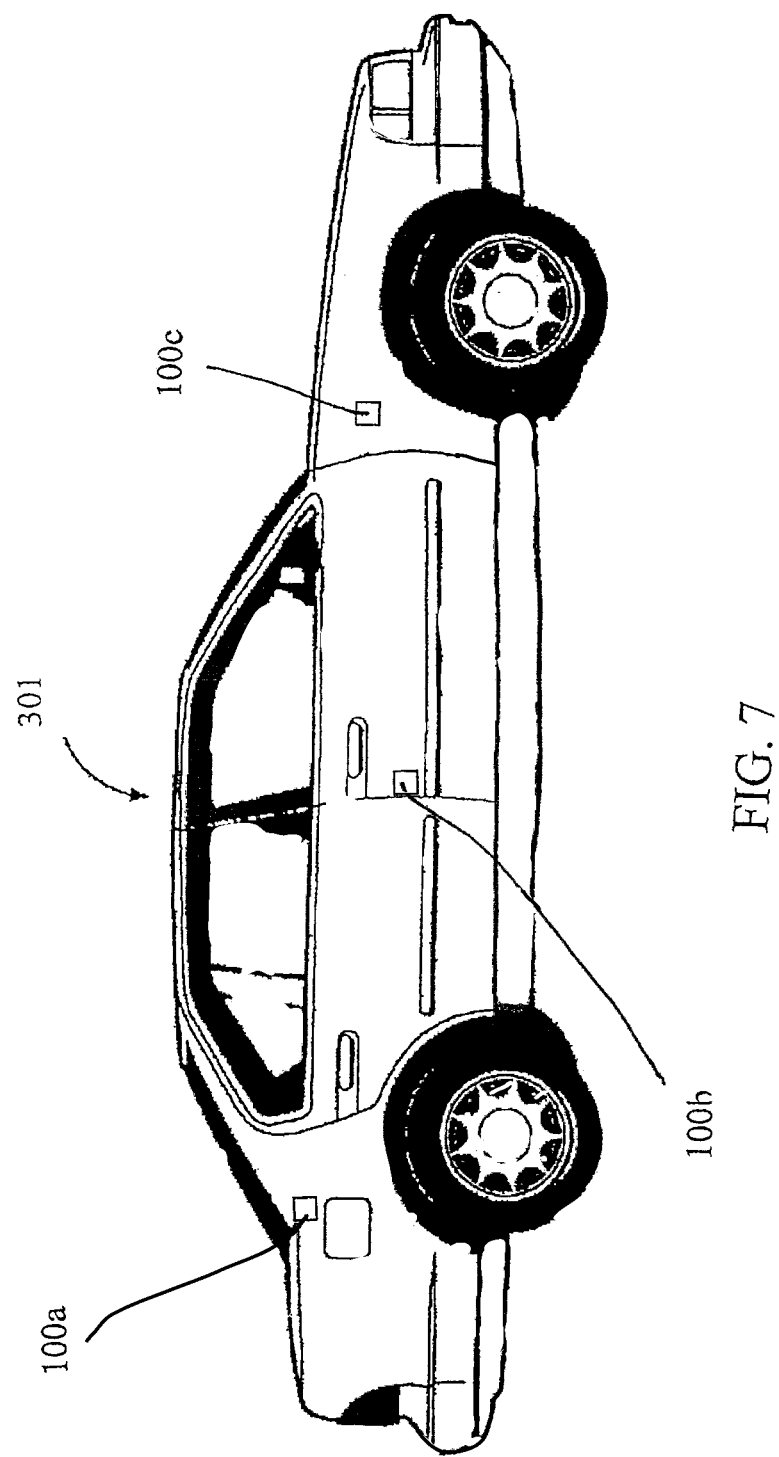
FIG. 7 shows a device for sensing and analyzing environmental factors and vibrations and the various positions onto a vehicle in which at least one device is located.

As shown in FIG. 7, the device 100 (described in reference to FIG. 1) may be removably attached to a surface, which is a location on an exterior or interior position of a vehicle 301. Additionally, as previously discussed, the surface may be, but is not limited to: an portion of interior surface, a portion of the vehicle body, a portion of the frame mounts, a door seal, or any part of the vehicle that is proximally located to the exterior environment of the vehicle 301. FIG. 7 illustrates the various surfaces onto which the device 100 may be removably attached. Further, the device 100 may be used while the vehicle is running or in motion. As shown in FIG. 7, the device 100 may be used on various surfaces of vehicle 301 to evaluate, measure, and analyze vibrations and resonances. For example, device 100a may be placed in proximity to the various contact points where the body of the vehicle 301 is mounted to the vehicle frame. A further example provides that device 100b may be placed in close in proximity to a door seal of the vehicle 301. Also, the device 100c may be placed, for example, on a section of the body to detect, measure, and analyze road noise or vibration with other vehicle parts. Additional examples include a device 100 placed on the interior to measure and analyze interior acoustics, a device 100 placed on the undercarriage to measure and analyze road noise, or a device 100 placed on contact points of the vehicle, where two different vehicle parts touch.

The device 100 operates in the same manner as previously discussed with respect to FIG. 1 and in discussion relevant to FIG. 1 applying to the alternate embodiment, the instrument 201. The only differing factor from the previous discussion is that the device measures and analyzes automotive NVH in a vehicle in lieu of a wolf tone in an instrument. Further, once the device 100 has diagnosed a level of automotive NVH, it may be corrected, as previously discussed, by using a substrate layer 150 or a compressive device (also referred to as a tensioner) 160 to correct the automotive NVH.

Figure 8:
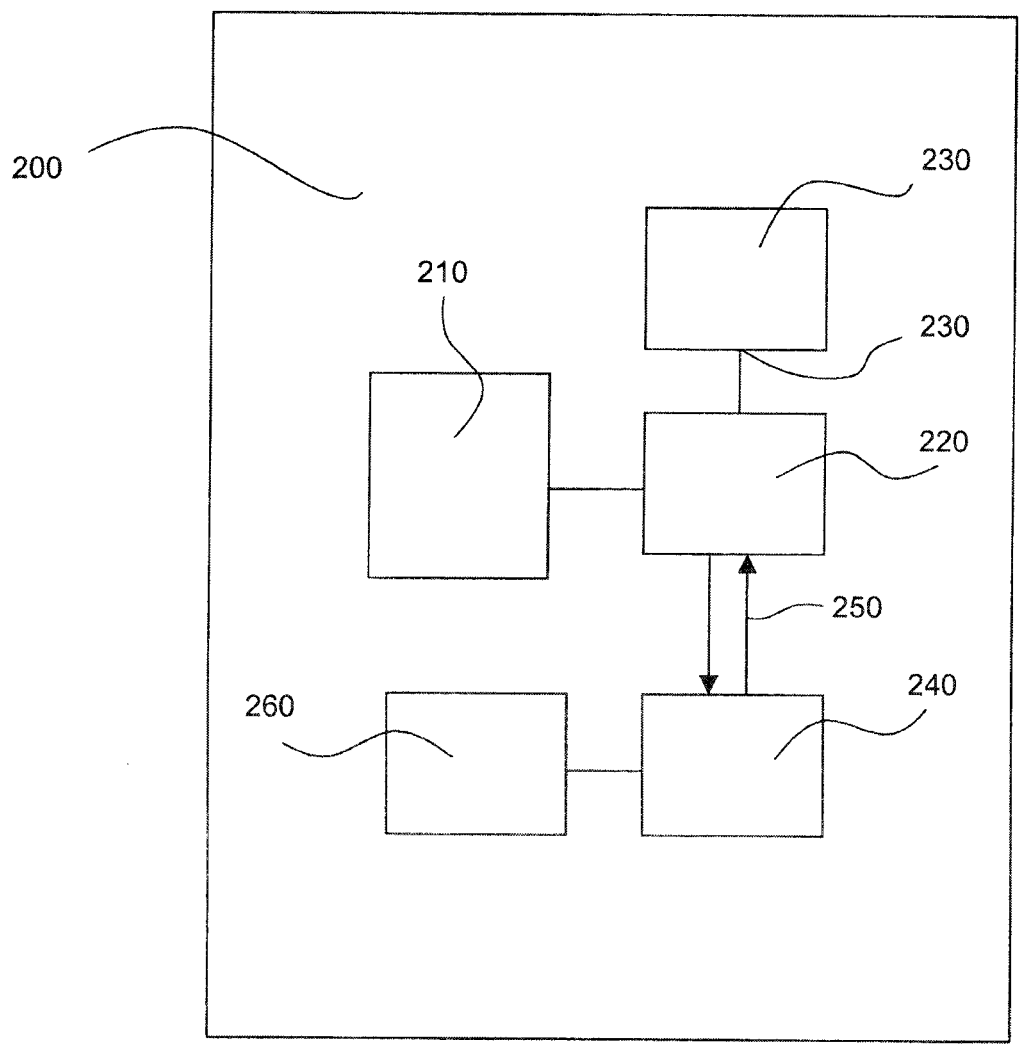
FIG. 8 shows a device for analyzing and correcting unwanted vibrations in accordance with the present invention.

Another embodiment comprises a device 200 for analyzing and correcting undesired vibrations comprising a power source 210, as shown in FIG. 8. The power source 210 may be either direct current or alternating current and it may be from batteries, generator, wall outlet, battery or any other known power generating or storing device.

A microprocessor 220 may be electrically connected to the power source 210. Also a sensor 230 having an output 235, wherein the sensor 230 may be electrically connected to the microprocessor 220. The sensor 230 should have a resolution that may be capable of receiving waves that would be considered undesirable, at least encompassing the normal hearing range. When the sensor 230 receives a signal within that measured range it may produce an output 235. The output 235 from the sensor 230 may include information such as magnitude of the signal. The output 235 from the sensor 230 may be sent to the microprocessor 220, which in turn generates a result.

A frequency generator 240 may be electrically connected to the microprocessor 220 and may create a feedback loop 250. The frequency generator 240 may be controlled by the result of the microprocessor 220 and may compensate for the unwanted frequency. The microprocessor 220 may then resample the environment and determine if the frequency generator 240 needs to be re-calibrated to a different frequency to compensate for the undesirable environmental frequencies. The device 200 may include an amplifier 260 in electrical connection with the frequency generator 240 if the magnitude of the frequency generated is not sufficient to counteract the undesirable environmental frequency.

A method for analyzing and correcting unwanted vibrations such as a wolf tone may be made by providing a sensor for detecting vibrations. If the vibration is unwanted, then it may be addressed by the device. Moreover, analyzing and correcting can be facilitated by providing a feedback loop for gathering sensed vibrations to determine if they are changing over a period of time. Furthermore, analyzing and correcting may include providing a signal generator to augment the vibration to correct any deficiencies in the frequencies. Additionally, analyzing and correcting may include sampling the augmented vibration with the sensor to determine the deviance from the desired vibration. Still further, analyzing and correcting may also include the next step, which may be analyzing the augmented vibration detected by the sensor with a microprocessor in order to determine the deviance from an ideal vibration, then generating a correction signal to correct the deviance in the ideal vibration.

In addition, the method of analyzing and correcting may include the resampling of the vibration with the sensor to determine if further correction may be required after analyzing the resampled vibration with the microprocessor. Then with the microprocessor determining a deviance in the resampled vibration, the deviance may be measured. The deviation can be addressed by generating a subsequent vibration signal to correct the deviation. When a signal is an additive wave, it may correct points canceled out by unwanted vibration. When the signal is a destructive wave, it may be used to remove the amplitude, change the frequency, or change the energy of the unwanted signal. When the signal is a complementary wave, it does not change the signal frequency, but it may increase the amplitude.

As an additional example, the frequency measured could be that of the ideal frequency (or ideal frequency threshold) of a certain automotive member, such as an engine mount or a suspension, while the respective vehicle is in operation. Once the ideal threshold frequencies of operation are known, future measurements of non-conforming or otherwise deviating frequencies may perform a diagnostic that may aid in the source identification issues and performance guidelines in the maintenance and repair of such automotive members.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims. The claims provide the scope of the coverage of the invention and should not be limited to the specific examples provided herein.

I claim:

1. A method for analyzing vibrations comprising:
providing a sensor for detecting vibrations;
providing a feedback loop for gathering sensed vibrations;
providing a signal generator to augment the vibration;
sampling the augmented vibration with the sensor; and
analyzing the augmented vibration detected by the sensor with a microprocessor to determine deviance from an ideal vibration.

2. The method of claim 1 further comprising:
resampling the vibration with the sensor;
analyzing the resampled vibration with the microprocessor; and
determining a deviance in the resampled vibration measured.

3. The method of claim 1 further comprising generating a subsequent vibration signal to correct the deviation.

4. The method of claim 1 wherein the signal is an additive wave.

5. The method of claim 1 wherein the signal is a destructive wave.

6. The method of claim 1 wherein the signal is a complementary wave.

7. The method of claim 1, further comprising correcting the augmented vibration.

* * * * *